United States Patent
Vahidi et al.

(10) Patent No.: US 10,129,699 B1
(45) Date of Patent: Nov. 13, 2018

(54) AUTOMATED TIERED EVENT DISPLAY SYSTEM

(71) Applicant: historide, Inc., Irvine, CA (US)

(72) Inventors: Bardia Vahidi, Irvine, CA (US); Maryam Rafia, Irvine, CA (US)

(73) Assignee: historide, Inc., Irvine, CA (US)

( * ) Notice: Subject to any disclaimer, the term of this patent is extended or adjusted under 35 U.S.C. 154(b) by 0 days.

(21) Appl. No.: 15/478,076

(22) Filed: Apr. 3, 2017

Related U.S. Application Data

(60) Provisional application No. 62/320,270, filed on Apr. 8, 2016.

(51) Int. Cl.
*H04W 24/00* (2009.01)
*H04W 4/02* (2018.01)
*H04W 4/04* (2009.01)
*H04M 1/725* (2006.01)

(52) U.S. Cl.
CPC ....... *H04W 4/023* (2013.01); *H04M 1/72572* (2013.01); *H04W 4/046* (2013.01)

(58) Field of Classification Search
CPC .. H04W 4/023; H04W 4/046; H04M 1/72572
USPC ....................................................... 455/457
See application file for complete search history.

(56) References Cited

U.S. PATENT DOCUMENTS

| | | | |
|---|---|---|---|
| 8,073,794 B2 | 12/2011 | Amer-Yahia et al. | |
| 8,775,429 B2 | 7/2014 | Choudhary et al. | |
| 2002/0062360 A1* | 5/2002 | Ishiguro | H04L 29/06 709/219 |
| 2005/0153687 A1* | 7/2005 | Niemenmaa | H04L 12/2854 455/414.2 |
| 2007/0281689 A1* | 12/2007 | Altman | G06Q 30/0207 455/435.1 |
| 2008/0281622 A1 | 11/2008 | Hoal | |
| 2011/0112937 A1 | 5/2011 | Schorrbusch et al. | |
| 2012/0141046 A1* | 6/2012 | Chen | G01C 21/32 382/282 |
| 2012/0197699 A1 | 8/2012 | Snell et al. | |
| 2013/0080345 A1 | 3/2013 | Rassi | |
| 2014/0040370 A1 | 2/2014 | Buhr | |
| 2014/0114866 A1 | 4/2014 | Abhyanker | |

(Continued)

OTHER PUBLICATIONS

Zhang, W., et al., "Interest-oriented versus relationship-oriented social network sites in China", First Monday, vol. 15, No. 8, http://journals.uic.edu/ojs/index.php/fm/article/view/2836/2582, Aug. 2, 2010, 14 pgs.

*Primary Examiner* — William Nealon
(74) *Attorney, Agent, or Firm* — Knobbe, Martens, Olson & Bear, LLP

(57) ABSTRACT

Systems and methods for automatically generating a digital map that illustrates event locations specific to the interests of a user are disclosed. These events may be located within a particular radius of a location of the user and presented on a map to the user. A map of the same geographic region presented to a second user who does not share the interests of the user may be presented with different events. The identification of a user's interests may be determined based at least in part on user data obtained from a shared interest networking site. A tiered display system can be used to modify the display of particular events based, for example, on a source of the event information or the quality of visual event data.

20 Claims, 8 Drawing Sheets

(56) References Cited

U.S. PATENT DOCUMENTS

2014/0129292 A1    5/2014   Ruvini
2015/0254710 A1    9/2015   Black et al.
2016/0092918 A1*   3/2016   Cha .................... G06Q 30/0251
                                                                     705/14.55

\* cited by examiner

650 — ••••○ AT&T 🗢  4:15 PM  ✈ ✱ 15%⬜

List  historide

652 {
| INSTANT EVENTS | NEAR ME ▽ |
| HAPPENING | NOW ▽ |

654 — MAP

① THE BULL
LAGUNA HILLS, CA                    15m

Lamborghini car show with test drives all weekend! I just drove a Aventador LP 750-4 Superveloce!!! It was super sweet.

② LAMBO99
ANAHEIM, CA                          1d

I just saw a sign for a Lamborghini enthusiasts convention tomorrow from 10 to 5 in Anaheim. I am totally going to go check that out. PM me if you want to meet up.

③ SWEET RIDE 87
IRVINE, CA                           10hrs

Lamborghini documentary is playing at the Irvine Theatre next week. There will be give aways and a chance to meet and talk with some of the Aventador engineers. Plus there is a surprise guest scheduled. Should come check it out.

I wonder if Jay Leno will be there. I hear he has a huge car collection.

654 — MAP

Home    NearNow    Post    Search

FIG. 6B

AUTOMATED TIERED EVENT DISPLAY SYSTEM

INCORPORATION BY REFERENCE TO ANY PRIORITY APPLICATIONS

This disclosure claims priority to U.S. Provisional Application No. 62/320,270 filed Apr. 8, 2016 and titled "AUTOMATED TIERED EVENT DISPLAY SYSTEM," the disclosure of which is expressly incorporated by reference herein in its entirety. Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Smartphones have become ubiquitous. Many smartphones enable the determination of their location using geolocation systems, such as the global positioning system (GPS). Many location-based services take advantage of the capability of smartphones to determine their location to determine the location of users who have access to the smartphones. The location of users is often used by location-based services to enhance their services. For example, check-in services enable users to report their location so as to receive discounts at the location or to let their friends know where they are located.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain embodiments of the present disclosure relate to a computer-implemented method that may be implemented by one or more computing devices configured with specific computer-executable instructions. The method may include establishing a communication connection with a user computing device using a communication protocol and accessing a location application programming interface at the user computing device to request a location of the user computing device. Further, the method may include receiving a set of location coordinates responsive to the location request and converting the set of location coordinates to a physical address. Moreover, the method may include identifying a user associated with the user computing device and determining an interests category associated with the user. The method may additionally include identifying an event occurring within a threshold distance of the physical address of the user computing device without receiving user input from the user. The event may be associated with the interests category. Further, the method may include determining a set of display rules associated with the event based at least in part on event data associated with the event. In addition, the method may include generating a map of event locations including a location of the event, wherein the location of the event is illustrated on the map based at least in part on the set of display rules. Moreover, the method may include outputting the map for display to the user.

In certain embodiments, determining the set of display rules may include determining whether the event data satisfies a first set of display criteria. In response to determining that the event data satisfies the first set of display criteria, the method may further include associating the event with a first set of display rules and determining whether the event data satisfies a second set of display criteria. In response to determining that the event data satisfies the second set of display criteria, the method may include associating the event with a second set of display rules. In response to determining that the event data does not satisfy the first set of display criteria, the method may include associating the event with a default set of display rules.

Outputting the map for display may comprise transmitting map data to the user computing device, enabling the user computing device to generate the map. Further, the method may include receiving the event data associated with the event; and using a parameter model to obtain a classification of the event based at least in part on the event data. The classification may correspond to the interests category. Moreover, the method may include determining a location radius for the event based at least in part on the event data. The location of the user computing device may be within the location radius.

In some embodiments, the method may include associating the event with a time-to-live value based at least in part on the event data. The time-to-live value may be associated with a period of time when the event is included in the map of event locations. In addition, the threshold distance may be based at least in part on a commute time between the physical address and the location of the event based at least in part on a commute criterion. In some cases, the commute criterion includes one or more of a time of day or a traffic condition of a route between the physical address and the location of the event. Furthermore, the method may include updating the map to illustrate a different set of event locations based at least in part on a determined change in the set of location coordinates of the user computing device.

Other embodiments of the present disclosure relate to a system that includes an electronic data store and a hardware processor. The electronic data store may be configured to store event data for a plurality of events occurring in the real world. The hardware processor may be in communication with the electronic data store and may be configured to execute specific computer-executable instructions to at least establish a communication connection with a user computing device using a communication protocol. Further, the system may access a location application programming interface at the user computing device to request a location of the user computing device. Moreover, the system may receive a set of location coordinates responsive to the location request and convert the set of location coordinates to a physical address. The system may also identify a user associated with the user computing device and determine an interests category associated with the user. Moreover, the system may access the electronic data store to identify an event occurring within a threshold distance of the physical address of the user computing device without receiving user input from the user. The event may be associated with the interests category. In addition, the system may determine a set of display rules associated with the event based at least in part on event data associated with the event and generate a map of event locations including a location of the event. The location of the event may be illustrated on the map based at least in part on the set of display rules. Further, the system may output the map for display to the user.

In some embodiments, the hardware processor is further configured to determine the set of display rules by determining whether the event data satisfies a first set of display criteria. In response to determining that the event data satisfies the first set of display criteria, the hardware processor may associate the event with a first set of display rules and determining whether the event data satisfies a second set of display criteria. In response to determining that the event data satisfies the second set of display criteria, the hardware processor may associate the event with a second set of display rules. Further, in response to determining that the event data does not satisfy the first set of display criteria, the hardware processor may be further configured to associate the event with a default set of display rules.

In some embodiments, the hardware processor is further configured to output the map for display by transmitting map data to the user computing device, enabling the user computing device to generate the map. Moreover, the hardware processor may be further configured to receive the event data associated with the event and use a parameter model to obtain a classification of the event based at least in part on the event data. The classification may correspond to the interests category.

In addition, the hardware processor may be further configured to determine a location radius for the event based at least in part on the event data. The location of the user computing device may be within the location radius. Further, the hardware processor may be further configured to associate the event with a time-to-live value based at least in part on the event data. The time-to-live value may be associated with a period of time when the event is included in the map of event locations.

Moreover, the threshold distance may be based at least in part on a commute time between the physical address and the location of the event based at least in part on a commute criterion. The commute criterion may include one or more of a time of day or a traffic condition of a route between the physical address and the location of the event. Furthermore, the hardware processor may be further configured to update the map to illustrate a different set of event locations based at least in part on a determined change in the set of location coordinates of the user computing device.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 6B illustrates an embodiment of a list user interface corresponding to the events of the dynamically generated user-specific event map user interface of FIG. 6A.

DETAILED DESCRIPTION OF SPECIFIC EMBODIMENTS

Introduction

Figure 1:
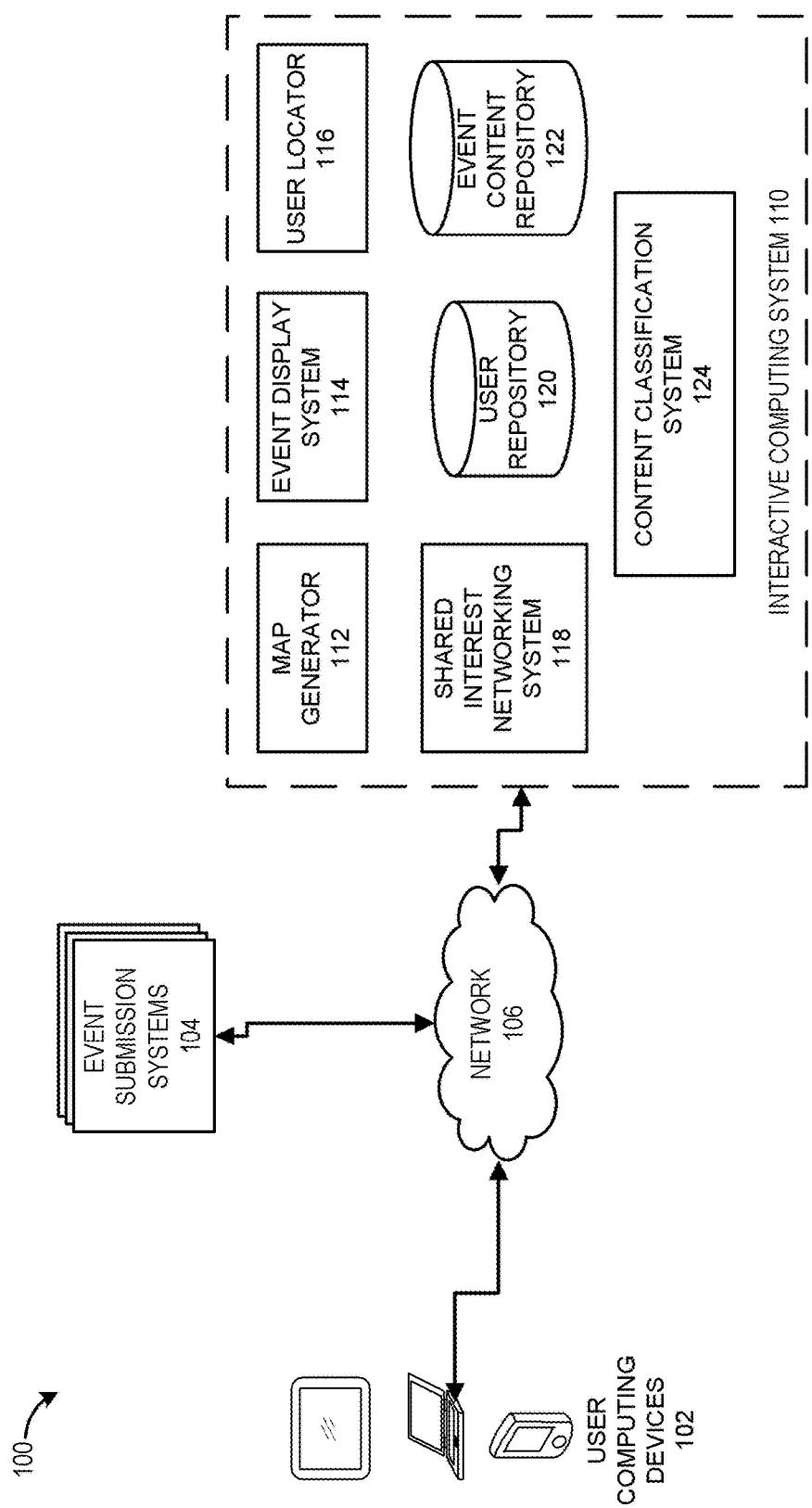
FIG. 1 illustrates an embodiment of a networked computing environment that can implement one or more embodiments of a tiered event display system.

Many social networking sites that exist today are general interest sites that connect different users. Sometimes, a user may contact their network to obtain a response to a query. For example, a user may ask for suggestions on items to obtain, services to hire, or places to visit. Often times, when receiving a response, the user does not know how well-informed the user is providing the response. For example, a suggestion of a particular Italian restaurant may be provided by another user who is not a fan of Italian food. As a second example, a suggestion of a particular car mechanic may be provided by another user who owns an American car. The mechanic may be great at fixing American cars, but if the user owns a German import, the suggestion may be of limited value to the owner of the German import. As a third example, a user may receive a suggestion to visit a number of art museums when visiting a particular city. However, if the user is more interested in car shows and drag races than art, the suggestion may be of limited value to the user.

Embodiments disclosed herein relate to systems and methods for automatically generating a digital map that includes the identification of events that are specific to the interests of the user. Further, in some embodiments, notifications of the events may be presented to the user via an alternative user interface, such as a list or an alert notification. The events may include any scheduled or ad hoc event, occasion, location, appearance, function, gathering, or the like that are related to a user's interests. For example, supposing that the user has an interest in race cars, the events may include one or more events relating to race cars, such as, for example, a race car museum, a race car convention, a gathering of race car fans or collectors, an opportunity to drive race cars on a test track, a race car building class, and the like. These events may be located within a particular radius of a location of the user who is interested in race cars and presented on a map to the user. If an event is located outside of the particular radius, it may be omitted from the map generated for display to the user. Further, a map of the same geographic region presented to the user may not include an identity of the events when the map is presented to a second user who is not identified as being interested in race cars. In certain embodiments, the identification of a user's interests may be determined based at least in part on an identification of an interests category associated with the user. The interests category may be determined from information provided by the user to an interests-based or topic-based social networking site or to a shared interest networking network site. In certain embodiments, the events may include advertisements, promotions, sales, or any other event sponsored by an entity to encourage visitors and/or the sale of items or services.

Unlike services that enable a user to search for particular static locations, such as restaurants or mechanics, embodiments disclosed herein provide a dynamic and continuously updated display or notification of both dynamic and static events. For example, as a user interested in German cars enters a geographic area, the user may be presented via a map, an alert, or a notification systems, with information relating to static locations (e.g., businesses) that relate to German cars and are always present at the particular locations and dynamic events (e.g., travelling car shows or meetups with users who share an interest in German cars) that may exists for a limited time (e.g., once, for a particular week, or a particular weekend, etc.).

In certain embodiments, the systems and methods described herein can use a tiered display system to modify how particular events are displayed to a user based on a number of display criteria. In some cases, events may be submitted by entities, such as event hosts, and/or by individual users, such as users who notice the occurrence or planned occurrence of an event while driving by the event or a location of the planned event. In some such cases, the information and formatting of the information provided by a representative of an entity and an unaffiliated user may vary. For example, the entity representative may provide complete event information (for example, time, location, cost, or other particular event-details) and a professional-looking or specially created picture (e.g., a flyer) for a first event. The unaffiliated user may provide a picture of a sign or flyer, such as may be taken by the user's camera, and a location of a second event. In such cases, information relating to the first event may be presented to potentially interested users of the first event within a larger geographic radius and for a longer time period compared to the second event. In certain embodiments, the determination of the geographic radius and the length of time that information associated with an event is presented to users may be based at least in part on a status of a user, or affiliated entity, who submitted the event and/or on a fee or credit structure.

Although primarily described with respect to automobile and/or vehicle events, the present disclosure is not limited as such. The present disclosure may be applied to any type of interest or topic and may be used to automatically identify and alert a user to any type of event of interest to the user as determined based on information provided by the user to an interests or topic-based networking site. For example, a user interested in comic books may join a social networking site for comic book and manga fans. As part of the user's participation on the social networking site, it may be determined that the user is particularly interested in western-style comics. Using embodiments disclosed herein, the user may be automatically presented with, for example, comic book conventions, comic-trading clubs, and comic-book sales at comic stores that are within a particular radius of the user and/or that are occurring within a particular time period. As another example, if it is determined that a user is interested in cooking, the user may be presented with the location of cooking clubs and advertisements for sales or inventory of difficult to find or expensive cooking ingredients. In yet another example, a user who is interested in bike riding may post an event inviting other users within a particular geographic radius to join the user for a weekend bike ride. Information relating to this bike-riding event may automatically be provided to users within the particular geographic radius that are identified as interested in bike-riding based on user profiles for the users.

Example Networked Computing Environment

FIG. 1 illustrates an embodiment of a networked computing environment 100 that can implement one or more embodiments of a tiered event display system, which may include an interactive computing system 110. The interactive computing system 110 includes any system capable of automatically generating a user interface, such as a digital map, to present the location of events occurring within a particular time period to a user associated with one or more particular interests that correspond to the events. In certain embodiments, the interactive computing system 110 may be implemented in hardware, and software, or a combination of hardware and software. Further, interactive computing system 110 may include a number of additional systems, which may each be implemented in hardware, software, or combination of hardware and software. These additional systems may include a map generator 112, an event display system 114, a user locator 116, a shared interest networking system 118, the content classification system 124, a user repository 120, or an event content repository 122.

The map generator 112 may include any system that can automatically generate user specific maps based at least in part on a user's location and a determination of a user's interests. The user's interests may be identified based on a shared interest networking site of which the user is a member. Advantageously, in certain embodiments, a user may be presented with information relating to ongoing events near (e.g., within a particular radius) the user that may be of interest to the user without the user initiating a search for the events.

The generated map may be presented to the user via an event display system 114 that may transmit a copy of the digital map, or information for re-creating the digital map, to a user computing device 102 associated with the user. The event display system 114 may automatically cause the map, or an alert indicating that events are available for the user to review via a list or the map, to be generated and presented to the user based at least in part on a trigger. The trigger may be based on the user's location, an indication that the user is planning to visit a particular geographic location, an identification of or a change in a user's interests, the identification of a new event, a command from a user, or any other trigger that may indicate the availability of events of interest to the user within a particular location or occurring at a particular time. Further, the trigger may be based, at least in part, on information obtained for the user from an interests or topic based social networking site.

Further, the event display system 114 may present additional user interfaces and/or notification information to the user computing device 102 for presenting information associated with one or more events to the user and/or for notifying the user that events of interest may be located within a threshold distance from the user and/or are occurring within a threshold time period from a current time period. For example, the event display system 114 may generate a list of events to present to a user. As another example, the event display system 114 may cause an alert to be presented to the user on the user computing device 102 informing the user that one or more events occurring within a threshold time period and potentially of interest to the user may be located within a particular geographic area where the user is currently located. Information relating to different events may be stored at the event content repository 122. Further, the event content repository 122 may store categorizations or classifications of the events enabling the map generator 112 to identify events corresponding to particular interests.

To determine events to present to the user, the interactive computing system 110 may use the user locator 116 to identify the location of the user. The location of the user may be determined or estimated based on a determination of a location of the user computing device 102 associated with the user. Alternatively, or in addition, the user's location may be determined by querying the user. In some embodiments, the user's location may be identified using a satellite-based location system, such as the global positioning system (GPS). In other embodiments, the user's location may be determined by triangulating a location of the user computing device 102 using, for example, the plurality of cell towers and/or wireless routers.

The shared interest networking system 118 may generate or host a networking site for enabling users who share similar interests to connect and communicate with each other. For example, the shared interest networking system 118 may host a social networking site for users who are interested in different types of vehicles. Users who are interested in similar types of vehicles may form links with each other on the shared interest networking site. For example, users who are interested in Lamborghinis™ may be linked together in the shared interest networking site. As another example, users who are interested in fishing boats may be linked together in the shared interest networking site. Information regarding user's interests may be stored at a user repository 120. In some embodiments, information regarding user interests may be provided by the users upon registering for the shared interest networking site and/or at any other time when using the shared interest networking site. Alternatively, or in addition, information regarding user interests may be determined by using one or more data mining processes to analyze user profiles created on the shared interest networking site by the users.

The content classification system 124 may be used to classify events based at least in part on information for the events received by the interactive computing system 110. The event classifications may be stored with the events at the event content repository 122. Events may be classified based at least in part on keywords associated with the events and/or based on classification information provided by a user submits the event to the interactive computing system 110. Further, in some embodiments, events may be classified using one or more machine learning processes or algorithms. For example, a machine learning system may be trained and/or a prediction model may be generated using historical event data and manually derived classifications. Using the generated prediction model, an event submitted by a user may be classified by determining a probability that an event is to have a particular classification. The probability may be determined by applying particular data associated with the event to the generated prediction model. The determined classification for the event may be stored with information associated with the event at the event content repository 122.

Users may interact with the shared interest networking site via one or more user computing devices 102. Further, users may receive information about events including notifications and/or generated maps via the user computing devices 102. The user computing devices 102 may communicate with the interactive computing system 110 via a network 106.

Information about events may be provided to the interactive computing system 110 via an event submission system 104. Alternatively, or in addition, events may be submitted to the interactive computing system 110 via a user computing device 102. The event submission systems 104 may be user computing devices associated with a particular entity that is hosting and/or is responsible for promoting an event.

The user computing devices 102 can include a wide variety of computing devices including personal computing devices, tablet computing devices, electronic reader devices, mobile devices (e.g., mobile phones, media players, hand-held gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), kiosks, speaker systems, and various other electronic devices and appliances. Further, the user computing devices 102 can include any type of software (such as a web browser) that can facilitate communication with the interactive computing system 110. Moreover, in certain embodiments, the event submission systems 104 may include one or more of the embodiments described with respect to the user computing devices 102.

The network 106 may be a publicly accessible network of linked networks, possibly operated by various distinct parties. Further, in some cases, the network 106 may include the Internet. In other embodiments, the network 106 may include a private network, personal area network, local area network, wide area network, cable network, satellite network, cellular telephone network, etc., or a combination thereof, each with access to and/or from an external network, such as the Internet.

The general architecture of the interactive computing system 110 may include an arrangement of computer hardware and software components as previously described that may be used to implement aspects of the present disclosure. The interactive computing system 110 may include many more (or fewer) elements than those illustrated. It is not necessary, however, that all of these elements be shown in order to provide an enabling disclosure. Further, the interactive computing system 110 may include a processing unit, a network interface, a computer readable medium drive, an input/output device interface, a display, and an input device, all of which may communicate with one another by way of a communication bus. The network interface may provide connectivity to one or more networks or computing systems. The processing unit may thus receive information and instructions from other computing systems or services via the network 106. The processing unit may also communicate to and from memory and further provide output information for an optional display via the input/output device interface. The input/output device interface may also accept input from the optional input device, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or other input device known in the art.

The memory may contain computer program instructions (grouped as modules or components in some embodiments) that the processing unit executes in order to implement one or more embodiments. The memory may generally include RAM, ROM and/or other persistent, auxiliary or non-transitory computer readable media. The memory may store an operating system that provides computer program instructions for use by the processing unit in the general administration and operation of the interaction service. The memory may further include computer program instructions and other information for implementing aspects of the present disclosure. For example, in one embodiment, the memory includes a user interface module that generates user interfaces (and/or instructions therefor) for display upon a computing device, e.g., via a navigation interface such as a browser or application installed on the computing device. In addition, memory may include or communicate with an image data repository, a dimension data repository, and/or one or more other data stores.

Further, although certain examples are illustrated herein in the context of an interactive computing system 110 that communicates with a separate user computing device 102, this is not a limitation on the systems and methods described herein. It will also be appreciated that, in some embodiments, a user computing device 102 may implement functionality that is otherwise described herein as being implemented by the elements and/or systems of the interactive computing system 110. For example, in some embodiments, a user computing device 102 can generate a map of the location of events based at least in part on event data identified and provided by the interactive computing system 110.

In some embodiments, the interactive computing system 110 is distributed among a plurality of computing systems. Advantageously, by distributing the interactive computing system 110, interest-based event maps can be generated faster compared to a non-distributed system. For example, a set of processing resources corresponding to a set of computing systems can be allocated for a particular geographic region while another set of processing resources corresponding to a different set of computing systems can be allocated for another geographic region reducing the number of events to be processed for an interest-based event map for a particular user located at a physical area. As another example, different computer systems or compute nodes can be assigned to process different event types thereby distributed the processing of event data across multiple computer systems.

Example Event Display Process

Figure 2:
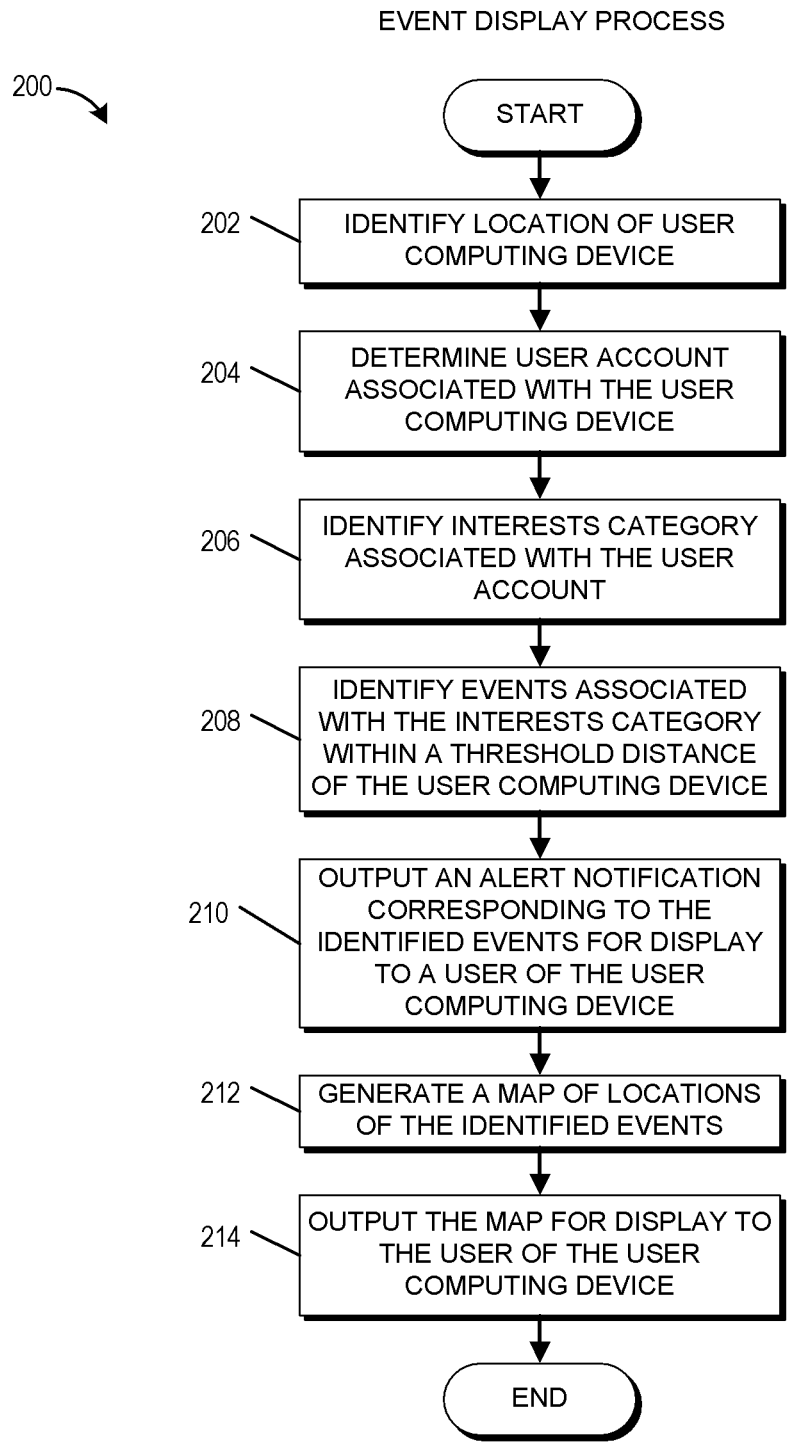
FIG. 2 presents a flowchart of an embodiment of an event display process.

FIG. 2 presents a flowchart of an embodiment of an event display process 200. The process 200 can be implemented by any system that can automatically select events to automatically display to a user based at least in part on the user's determined interests. For example, the process 200 can be implemented by an interactive computing system 110, a map generator 112, an event display system 114, a user locator 116, a shared interest networking system 119, or a content classification system 124, to name a few. Although any number of systems, in whole or in part, can implement the process 200, to simplify the discussion, portions of the process 200 will be described with reference to particular systems.

In some embodiments, the process 200 may be performed repeatedly or at particular time intervals. Alternatively, or in addition, the process 200 may be performed in response to a command from a user. In some embodiments, the process 200 may be performed each time a detected location of the user changes by a particular threshold amount. Alternatively, or in addition, the process 200 may be performed when it is determined that the user is at location that the user has not previously visited or has not visited within a threshold period of time. In some embodiments, the process 200 may be repeated in response to the inclusion of a new event, or a threshold number of new events to a set of events in an event content repository 122 or submitted to an interactive computing system 110.

The occurrence of the process 200 may be triggered based, at least in part, on any of the previously described triggers. For example, the process 200 may occur in response to a detection of the user's location, a change in the user's location by more than a threshold distance, a change in a user's interests, the identification of a new event or a threshold number of new events, and the like.

The process 200 begins at block 202 where, for example, the user locator 116 identifies a location of a user computing device 102 associated with a particular user. Although described as part of the process 200, as described above, the operations of the block 202 may, in some cases, trigger the occurrence of the process 200 or the occurrence of the remainder of the process 200. Identifying the location of the user computing device 102 may include identifying a geographic location of the user computing device 102. The geographic location may be identified using a satellite-based location identification system, such as a GPS system, or any other system and may be used to identify the geographic location of a user computing device. In some cases, the location of the user computing device 102 may be provided by a user associated with the user computing device 102. In certain embodiments, the block 202 may include identifying an anticipated geographic location for the user computing device 102. For example, a user may identify a particular location for which the user desires or plans to visit during another time period.

The block 202 may include establishing a communication connection between the interactive computing system 110 and a user computing device 102. In some cases, the user computing device 102 may initiate establishment of the communication connection with the interactive computing system 110. Establishing the communication connection may be triggered by a user interacting with an application on the user computing device 102, such as the shared interest networking system 118 via a browser or a dedicated application associated with the shared interest networking system 118. Although described as the user computing device 102 establishing the connection with the interactive computing system 110, in some cases, the process may be reversed with the interactive computing system 110 establishing the communication connection with the user computing device 102.

Establishing the communication connection may involve the user computing device 102 sending a communication connection request using a communication protocol to the interactive computing system 110. The interactive computing system 110 may acknowledge the request and, if the request is accepted, communication connection may be established. In some cases, a handshake process is completed. The communication connection may be created using an established protocol, such as a TCP/IP protocol.

Identifying the location of the user computing device 102 may include accessing an application programmer interface (API) of a geolocation system hosted at least in part by the user computing device 102. In some cases, the geolocation system may be a satellite based location system, such as the global positioning system (GPS). In other cases, the geolocation system may be based on cellular towers.

The user locator 116 can make an API call to the user computing device 102, which can return a location of the user computing device 102. In some cases, the location of the user computing device 102 is returned as a set of latitude and longitude coordinates. The user locator 116 can translate the latitude and longitude coordinates into an address or region, such as a country, state, city, neighborhood, street, or other geopolitical location. In some embodiments, the user computing device 102 may identify the address or region associated with its location based on the latitude and longitude coordinates determined from a geolocation system and may provide the address or region information to the user locator 116 in response to an API call. In some cases, the coordinate location may be translated into the physical address or region using a geocoding database or repository.

In some embodiments, the location of the user computing device 102 may be determined based at least in part on an internet protocol (IP) address. For example, the user locator 116 may use an API call to request the IP address of the user computing device 102. Using the IP address, the user locator 116 can access a table indexed by IP addresses to identify the user. Further, the user locator 116 can determine the user's location by determining a location of the IP address based on, for example, a table of IP address locations.

In some embodiments, the user computing device 102 may broadcast its location. In some cases, the location broadcast may be in response to a location request by the user locator 116. Further, in some cases, the user computing device 102 may broadcast its location in response to a user interacting with a shared interest networking system. For example, a user may interact with a user interface of the shared interest networking system to request the location of users or events near the user that are related to the user's interest. In response, the shared interest networking system may access an API on the user computing device 102 to cause the user computing device 102 to broadcast or provide its location.

At block 204, the shared interest networking system 118 determines a user account associated with the user computing device 102. Determining a user account associated with the user computing device 102 may include identifying a username, or other unique identifying information, associated with the user at a shared interest networking site hosted by the shared interest networking system 118. Further, determining the user account may include accessing user data stored at the user repository 120.

The shared interest networking system 118 identifies an interests category associated with the user account at block 206. Identifying the interests category may include accessing user data associated with the user at the user repository 120. Further, the interests category may be identified using a parameter model, obtained using a machine learning algorithm, to determine a probability that a user is associated with a particular interests category. In some cases, the interests category may be self-identified by the user.

At block 208, the event display system 114 identifies one or more events associated with the interests category located within a threshold distance of the user computing device 102. The one or more events may be identified by accessing the event content repository 122. Further, the one or more events may include events identified within a particular time period. For example, if it is determined, based at least in part on the user's profile of the shared interest networking site, that the user has an interest in motorcycles, one or more events occurring within 24 hours, or any other particular time period, that relate to motorcycles may be identified at the block 208. In some cases, the events selected may be based at least in part on one or more filters set by a user. For example, the user can filter the user's interests to see events associated with a particular interest. Further, the user can filter the type of event desired, the timing of the event, the event location, the event cost, and the like.

At block 210, the event display system 114 outputs an alert notification corresponding to the identified events for display to a user of the user computing device 102. In some embodiments, the alert notification is a push notification that causes the user computing device 102 to alert the user to the existence of one or more events occurring within a particular time period and within a threshold distance of the identified location of the user computing device 102. In some cases, the push notification may identify the number of events within the threshold distance and the particular time period. In some cases, the block 210 may include generating a list or other user interface to present information associated with the one or more events to a user. In certain embodiments, the block 210 may be optional or omitted.

The map generator 112, at block 212, generates a map of locations of the identified events were identified at the block 208. Generating the map locations of the identified events may include annotating a map centered at the location of the user computing device 102. In some embodiments, the block 212 may include generating an alternative user interface instead of the map or in addition the map to present information relating to the events to a user. For example, a listing of events may be generated as part of the block 212. Further, the events included in the user interface and/or the format of the event information for the events may be based at least in part on display criteria and/or display rules for the events as is described in more detail with respect to FIG. 4 below. Further, as described in more detail below, some events may be displayed differently than other events based at least in part on the content display criteria that are satisfied by the event data submitted along with the identification of the events.

Generating the map of locations may include accessing an API at the user computing device 102 to create a user interface that includes the map on the user computing device 102. In some such cases, the map may be created at the user computing device 102 in response to commands received from the map generator 112. In other cases, the map generator 112 may provide event information to the user computing device and the map of the events may be generated by the user computing device 102. These events may be provided to the user computing device 102 by accessing an API. In some cases, the events may be provided using a markup language, such as by providing an eXtensible Markup Language (XML) file. This XML file may be interpreted by a map generator (not shown) on the user computing device 102 that creates the map of events for display on a user interface.

At block 214, the event display system 114 outputs the map generated at the block 212 for display to the user of the user computing device 102. In certain embodiments, the block 214 may include providing information for generating the map to the user computing device 102 enabling the user computing device 102 to re-create the map for presentation to a user at the user computing device 102.

In some embodiments, the event display system 114 may determine a type of the user computing device 102. For example, the event display system 114 may access an identifier via an API for the user computing device 102. In some cases, determining the type of the user computing device 102 may include determining an operating system or a version of an operating system running on the user computing device 102. Advantageously, in certain embodiments, by determining the type of the user computing device 102, the generated map or list of events may be formatted based on the capabilities of the user computing device 102. For example, the map may be optimized for a screen size of the user computing device 102. Further, by determining whether the user computing device 102 is a mobile device, or a device that is likely to be non-mobile (e.g., a desktop), the display of events may be modified. For example, if it is determined that the device is mobile, the map may include an option to initiate turn-by-turn navigation to a location hosting a selected event. On the other hand, if it is determined that the device is a non-mobile device, an option may be presented to text event information for a selected event to a user's mobile device. Thus, in some embodiments, context information may be used to modify the display of the map of events to a user.

As mentioned above, the process 200 may be repeated, at least in part, based on a change in the location of the user computing device 102. As the user computing device 102 location changes, different events may be identified and presented to a user on a map of event locations. In some cases, the map of event locations may include at least some of the events identified at the block 208 during a first iteration of the process 200 and at least some events identified during a second iteration of the process 200. In other words, as the user device 102 changes location or, in some cases, as time elapses, the events illustrated on the map generated at the block 212 may change to reflect the change of available events within a particular geographic area or during a particular time period.

Example Event Submission Process

Figure 3:
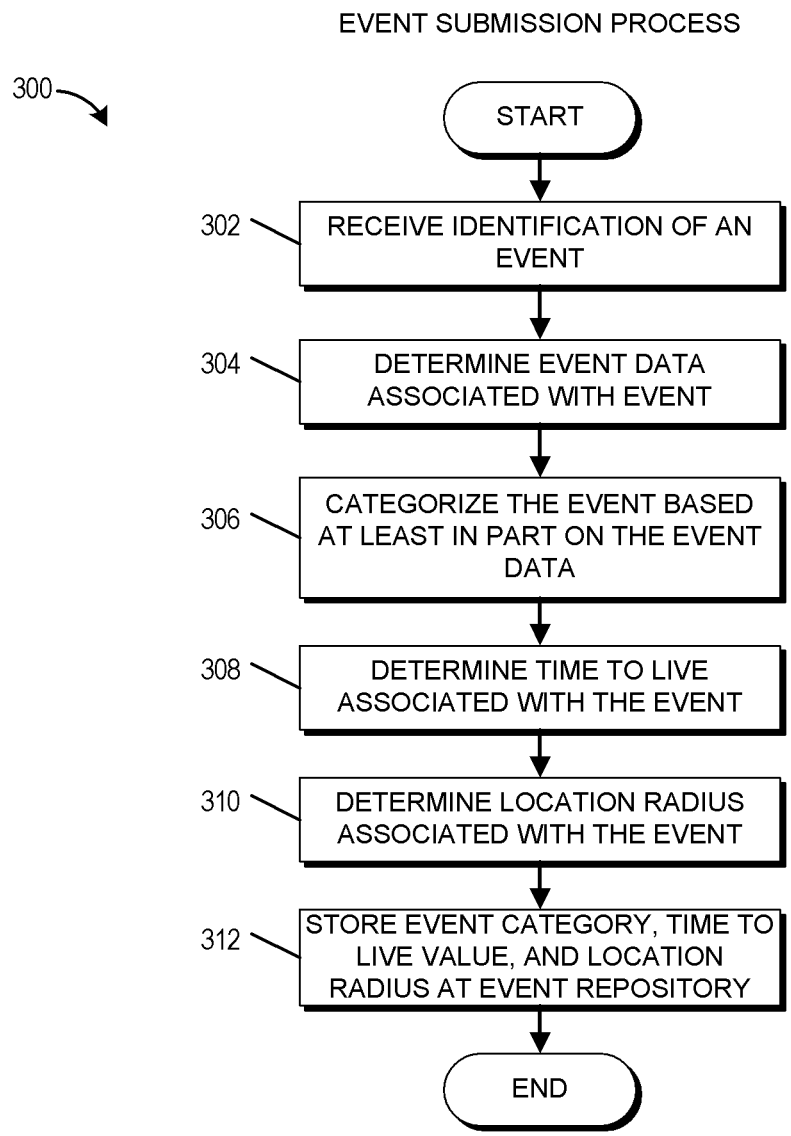
FIG. 3 presents a flowchart of an embodiment of an event submission process.

FIG. 3 presents a flowchart of an embodiment of an event submission process 300. The process 300 can be implemented by any system that can receive and categorize information associated with an event. For example, the process 300 can be implemented by an interactive computing system 110, a map generator 112, an event display system 114, a user locator 116, a shared interest networking system 119, or a content classification system 124, to name a few. Although any number of systems, in whole or in part, can implement the process 300, to simplify the discussion, portions of the process 300 will be described with reference to particular systems.

The process 300 begins at block 302 where, for example, the interactive computing system 110 receives an identification of an event. Receiving an identification of the event may include receiving event information associated with the event. This event information may include one or more images, videos, text, or audio associated with the event. In some cases, the event information may include advertisements or other information generated by an entity posting the event. Further, the event information may be received from a user associated with the event, such as an employee of an entity hosting the event, or from a user unaffiliated with the event, such as a passerby or an attendee of the event. In some cases, an unaffiliated user may generate at least some of the information provided to the block 302. For example, a passerby may capture an image or take a photo of an event or a sign advertising the event. This captured image or photo may be provided by the unaffiliated user to the interactive computing system 110. In certain embodiments, the event information may be provided via a user interface designed to receive event information. This user interface may include any type of user interface widget including, for example, text boxes, list boxes, dialog boxes, radio buttons, and the like. In addition, the user interface may accept the upload of files including images, audio, and video.

At block 304, the content classification system 124 determines event data associated with the event. Determining the event data may include accessing event information including one or more images, videos, text, or audio associated with the identified event. This event information may include the information provided at the block 302. Further, determining the event data may include analyzing the event information to determine one or more characteristics of the event that can be used to classify the event. These characteristics may include the type of event, the subject of the event, the length of the event, sub-events within the event (for example, particular panels or displays at the event), the event host, the number of time the event has previously occurred, whether the event is anticipated to be repeated at a later time period, the user capacity for the event, whether the event is indoors, outdoors, or a combination of the two, and any other characteristics that can be determined for the event and that may be used to classify the type of event. In certain embodiments, the content classification system 124 may automatically obtain additional information for the event by accessing one or more third party information sources via a network, such as the Internet. For example, upon receiving event data for an event, the content classification system 124 can automatically perform a network search based on the received event data or keywords derived therefrom to obtain further information for the event.

At block 306, the content classification system 124 categorizes the event based at least in part on the event data. Categorizing the events may include grouping together a plurality of events that share one or more characteristics or pieces of event data. For example, events that are related or at least partially related to sports cars may be grouped together. As another example, events that enable users to test drive cars may be grouped together. Events may be categorized or clustered together by comparing keywords associated with the events. The keywords may be supplied by the user that submitted the event and/or may automatically be extracted from the event data submitted for the event. Further, a user may self-categorize the event and/or provide an initial general classification for the event, which may then be associated with a sub-category that is determined automatically from the event data for the event.

In some embodiments, categorizing the events may include using one or more machine learning algorithms to classify events. For example, event data associated with an event may be provided to a parameter model generated using machine learning algorithm to determine a probability that the event is associated with a particular category. In some cases, the parameter model may be used to identify one or more classifications or clusters for the event. Further, in some cases, an event may be associated with multiple categories. For example, a particular event may be associated with a sports car category, a Ferrari® category, and a test drive category. Advantageously, in certain embodiments, by categorizing the events, systems herein can automatically identify and present to particular users the particular events that correspond to the interests of the particular users. Additional details for categorizing an event are described with respect to FIG. 4 below.

At block 308, the content classification system 124 determines a time-to-live value associated with the event. The time-to-live value may determine the length of time that an event may be displayed to a user. Further, in some cases, the block 308 may include determining a time period during which the event may be displayed to users. In some cases, the time-to-live value is included in event data provided by a user. Alternatively, or in addition, the time-to-live value may be determined automatically based at least in part on the event data. For example, the time-to-live value may be based at least in part on a length of the occurrence of the event and/or the event type of the event. In some cases, the time-to-live value may be determined based at least in part on whether one or more particular criteria are satisfied. These criteria may include, for example, the format of event data provided by user, the quality of the event data provided by the user (e.g., the quality of a picture provided as part of the event data), monetary remuneration, and the like.

The content classification system 124, at block 310, determines a location radius associated with the event. The location radius may indicate how close the user should be to the event before the user is notified of the event. As with the time-to-live value, in some cases, the location radius is included with the event data. Alternatively, or in addition, the location radius may be determined automatically based at least in part on the event data. For example, the location radius may be based at least in part on a length of the occurrence of the event and/or the event type of the event. In some cases, the location radius may be determined based at least in part on whether one or more particular criteria are satisfied. These criteria may include, for example, the format of event data provided by user, the quality of the event data provided by the user (e.g., the quality of a picture provided as part of the event data), monetary remuneration, and the like. In some embodiments, one or more of the time-to-live value in the location radius may be variable and may depend at least in part on the particular user. For example, a first user associated with a greater interest level for sports cars than a second user may be presented with information associated with the event for a longer period of time and/or when located a further distance from the event compared to the second user. In some embodiments, whether an event is displayed to a user may be based at least in part on the user's interests as determined by the shared interest networking system 118. Alternatively, or in addition, whether the event is displayed may be based at least in part on a filter that enables the user to filter interests corresponding to different events or to filter event types to be displayed.

The block 312, the interactive computing system 110 stores the event category, the time-to-live value, and the location radius at the event content repository 122. Further, in some cases, a location of the event may be stored at the event content repository 122 instead of, or in addition, to the location radius. In addition, the event data or information received at the block 302 may be stored with an identification of the event at the event content repository 122.

Example Event Categorization Process

Figure 4:
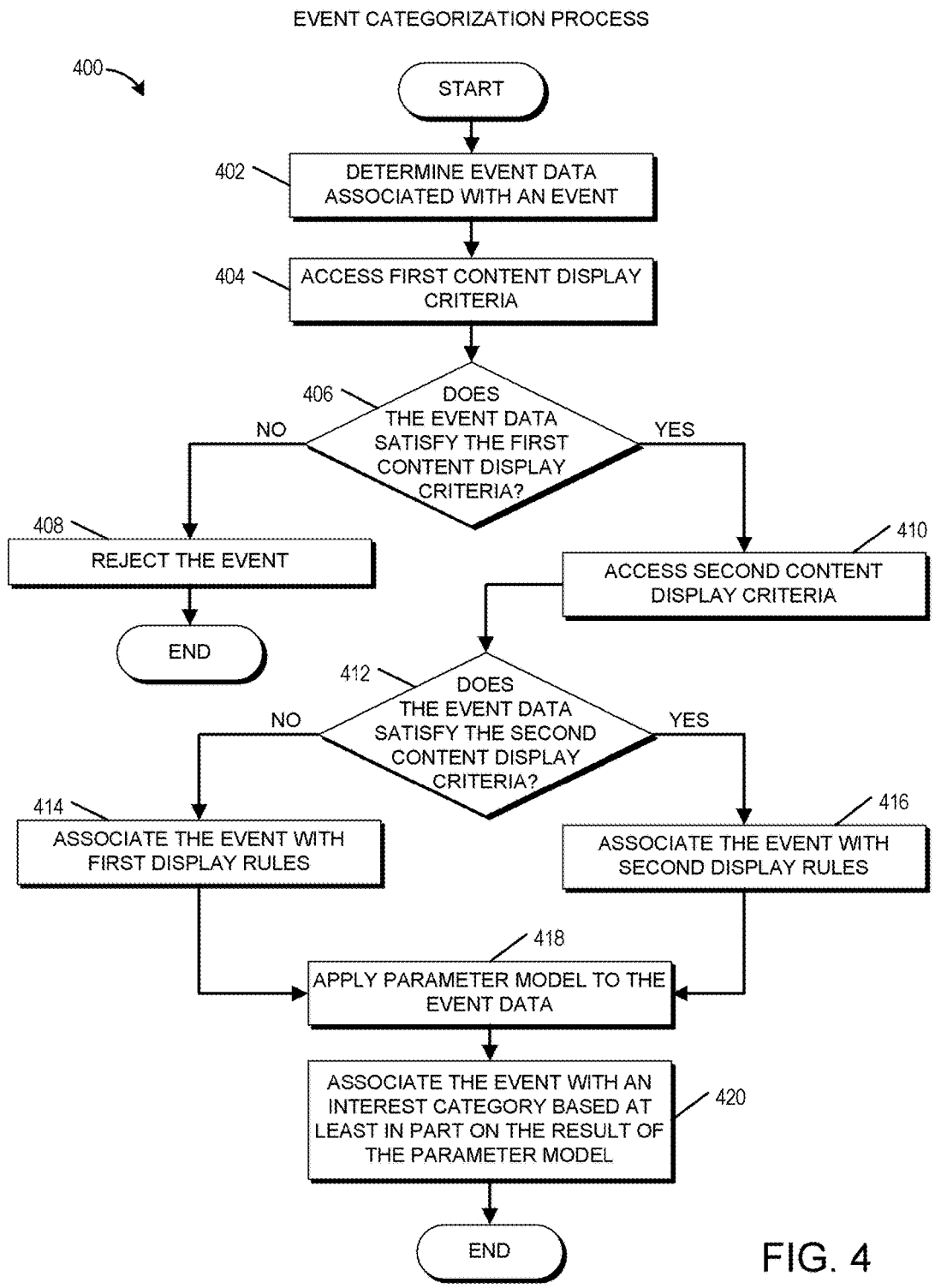
FIG. 4 presents a flowchart of an embodiment of an event categorization process.

FIG. 4 presents a flowchart of an embodiment of an event categorization process 400. The process 400 can be implemented by any system that can receive and categorize information associated with an event. For example, the process 400 can be implemented by an interactive computing system 110, a map generator 112, an event display system 114, a user locator 116, a shared interest networking system 119, or a content classification system 124, to name a few. Although any number of systems, in whole or in part, can implement the process 400, to simplify the discussion, portions of the process 400 will be described with reference to particular systems.

In certain embodiments, the process 400 may be performed upon receipt of event data associated with an event, such as during occurrence of the process 300. Alternatively, or in addition, the process 400 may be performed when the process 200 is triggered. Further, in some cases, the process 400 may be repeated for an event when additional event data is obtained for the event.

The process 400 begins at block 402 where, for example, the content classification system 124 determines event data associated with an event. In some embodiments, the event data is received from a single user that submits the event information to the interactive computing system 110. In other embodiments, the event data may be received from a plurality of users. In some such cases, the event data may be aggregated and/or weighted based at least in part on a source of the event data, the type of event data (e.g., event time and location may be weighted differently than a user supplied description of the event, which may be weighted differently than a title of the event), a number of users from the plurality of users that supplied the same piece of event data, etc. In some embodiments, some of the event data may be filtered. For example, if it is determined from accessing a third-party source that some of the event data is inaccurate, the inaccurate event data may be filtered form the other event data.

In some cases, the event data may include user reviews, opinions, or other comments relating to the event. In some embodiments, as additional event data is obtained over time, the process 400 may be repeated or updated. In certain embodiments, the block 402 may include one or more of the embodiments previously described with respect to the block 304.

At block 404, the content classification system 124 accesses first content display criteria. This first content display criteria may be accessed from the event content repository 122. Further, the first content display criteria may include any required display criteria for presenting information or event data corresponding to the event to a user. For example, the first content display criteria may include a location of the event, a time associated with the event (e.g., the length of the event, when the event starts, and the like), a title for the event, a format for data to be presented to the user (e.g., font size, font color, image size, volume of audio, and the like), an event type for the event, and the like.

At decision block 406, the content classification system 124 determines whether the event data satisfies the first content display criteria. In some embodiments, determining whether the event data satisfies the first content display criteria includes determining whether the event data includes information to satisfy the first content display criteria. For example, if the first content display criteria includes a time and a location of the event, determining whether the event data satisfies the first content display criteria may include determining whether the event data identifies the time and the location of the event.

If it is determined at the decision block 406 that the event data does not satisfy the first content display criteria, the interactive computing system 110 rejects the event. Rejecting the event may include alerting or informing the user that submitted the event via, for example an event submission system 104, that the event data provided for the event does not satisfy a minimum required display criteria. Alternatively, or in addition, the event may be associated with a particular set of display rules. For example, the event data associated with the event may be included in a listing of events that a user can access but that may not be automatically presented to the user and/or may not be included in a map of events presented to the user.

If it is determined at the decision block 406 that the event data does satisfy the first content display criteria, the content classification system 124 accesses second content display criteria. As with the first content display criteria, the second content display criteria may be accessed from the event content repository 122. In certain embodiments, the second content display criteria may include any display criteria that is unnecessary to cause event data corresponding to the event to be displayed to a user, but which may be used to modify the display of the event data to the user. In some cases, the second content display criteria may be related to the form of the event data instead of, or in addition to, the substance of the event data. For example, the second content display criteria may be related to whether event data is received in the form of an image, a video, and/or audio. Further, the second content display criteria may relate to whether monetary remuneration, or another type of credit, is received from a user that submits at least some of the event data.

At decision block 412, the content classification system 124 determines whether the event data satisfies the second content display criteria. In certain embodiments, the decision block 412 may include one or more of the embodiments described with respect to the block 406. Further, although illustrated as a separate decision block, in some embodiments, the operations of the decision block 406 and the decision block 412 may be performed in parallel or as part of a single determination. For example, at the decision block 406, the content classification system 124 can determine whether the event data satisfies the first content display criteria and/or the second content display criteria. As another alternative, the content classification system 124 may determine whether to associate the event with a particular set of display rules based on the particular criteria satisfied by the event data. In some embodiments, by using a tiered process to determine the display rules to associate with the event data, the amount of processing time for determining the display rules may be reduced compared to other systems that do not use a tiered approach.

If it is determined that the event data does not satisfy the second content display criteria, the event display system 114 associates the event with a first set of display rules at block 414. In some cases, the first set of display rules may be associated with a minimum set of display rules. Further, the display rules may be associated with how and/or when information associated with a particular event is displayed to a user. Furthermore, the display rules may be associated with whether information associated with the particular event is displayed to particular users.

If it is determined that the event data does satisfy the second content display criteria, the event display system 114 associates the event with a second set of display rules at block 416. As with the first set of display rules, the second set of display rules may be associated with how and/or when information associated with a particular event is displayed to a user. Furthermore as with the first set of display rules, the second set of display rules may be associated with whether information associated with a particular event is display to particular users. In certain embodiments, the second set of display rules may be a modified version of the first set of display rules. For example, the first set of display rules may indicate that information relating to an event is to be displayed for 12 hours to users that are within 10 miles of the event. The second set of display rules may indicate that information relating to the event is to be displayed for 24 hours to users that are within 20 miles of the event. Further, the first set of display rules may indicate that information relating to the event is to be displayed using a particular font while the second set of display rules may indicate that the information is to be displayed using a different font, which may be more appealing and/or easier to view than the font used by the first set of display rules. In some implementations, display rules included as part of the first display rules and or the second display rules may include rules on how events are displayed to a user on a map generated by the map generator 112. Further, the display rules may include rules on whether or not an alert is provided to a user when the user is within a particular distance from the event.

At block 418, the content classification system 124 applies one or more parameter models to the event data. Applying a parameter model to the event data may include using a mathematical algorithm determined by machine learning process to identify an event or interest category to associate the event with. In some cases, the output of the parameter model may be one or more event categories. Alternatively, or in addition, the output of the parameter model may be a probability that the event should be associated with one or more particular event categories. In some embodiments, the block 418 may include comparing one or more keywords included in the event data to one or more keywords associated with one or more particular event categories. Advantageously, in certain embodiments, by determining an event or interest category to associate with an event, interactive computing system 110 can automatically identify events that may be of interest to a particular user based at least in part on identified interests of the user.

At block 420, the content classification system 124 associates the event with an interest category based at least in part on the result of the parameter model. In some cases, the association of the event with the interests category may be stored at the event content repository 122.

Example Use Cases

Figure 5:
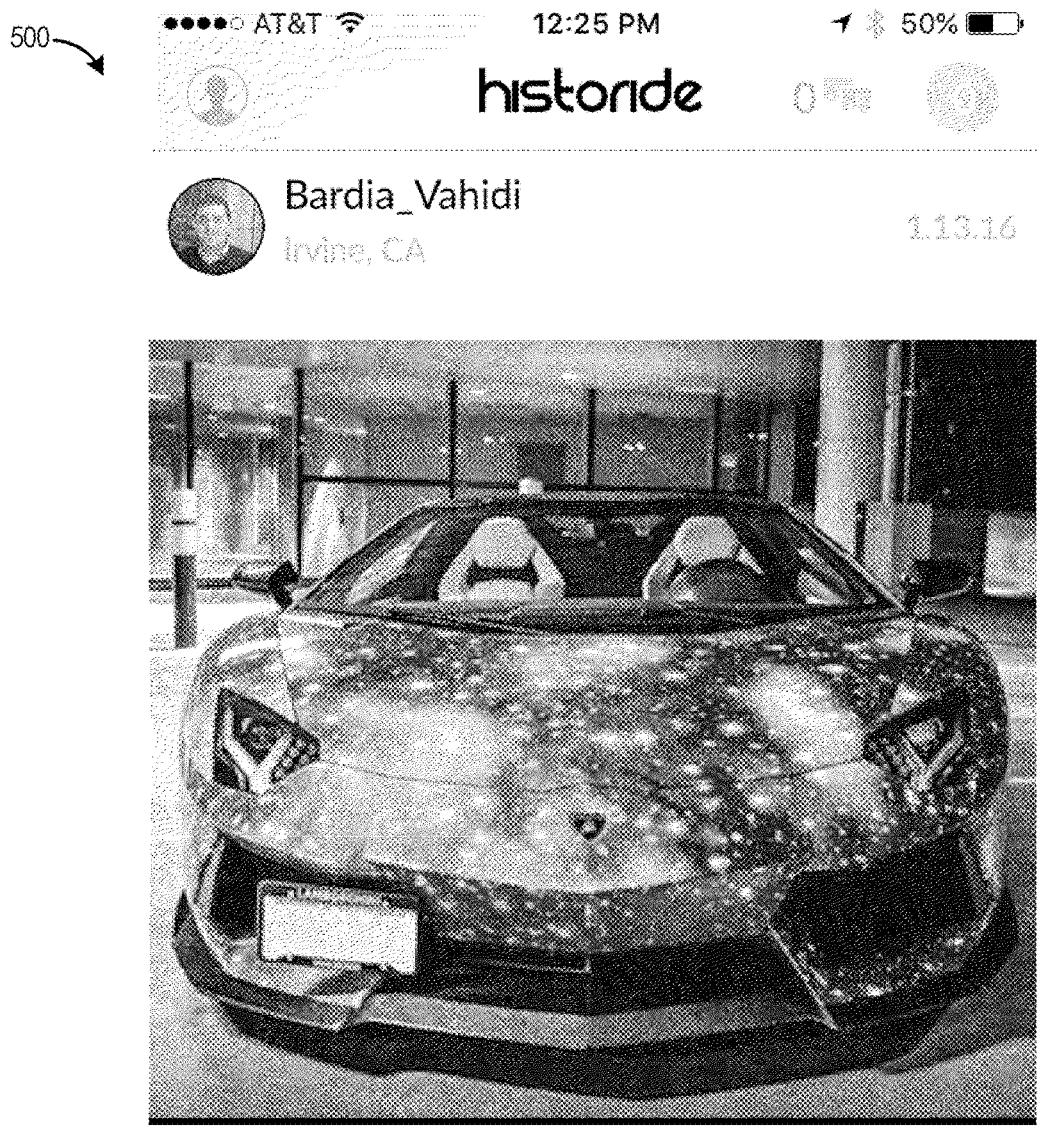
FIG. 5 illustrates an embodiment of a user interface for a topic-specific networking application.

FIG. 5 illustrates an embodiment of a user interface 500 for a topic-specific networking application. The topic specific networking application can enable users to identify their interests. In some cases, the topic specific networking application may automatically determine user's interests based on information provided by the user. For example, suppose that the topic specific networking application is related to vehicles. Such a case, the topic specific networking application may automatically determine that a user is interested in sports cars or Lamborghinis based on information supplied to the topic specific networking application.

Further, user interface 500 may present the user with an alert 502 that there are a number of events occurring near the user at a particular instant of time or within a threshold time period. This alert 502 is illustrated as a circle with a number within the circle indicating the number of events within the threshold distance of the user occurring within a particular time period. However, this disclosure is not limited as such and the alert 502 may take on any number of alternative forms.

The identification of the events associated with alert 502 may be performed automatically based at least in part on the user's location and the user's identified interests. For example, the process 200 may be used to identify and present events to the user. If the user is interested in viewing the events indicated by the alert 502, the user can select the NearNow button 504. By selecting the button 504, the user may be presented with a map showing the location of the events as illustrated in FIG. 6A or a list of the events as illustrated in FIG. 6B.

Figure 6A:
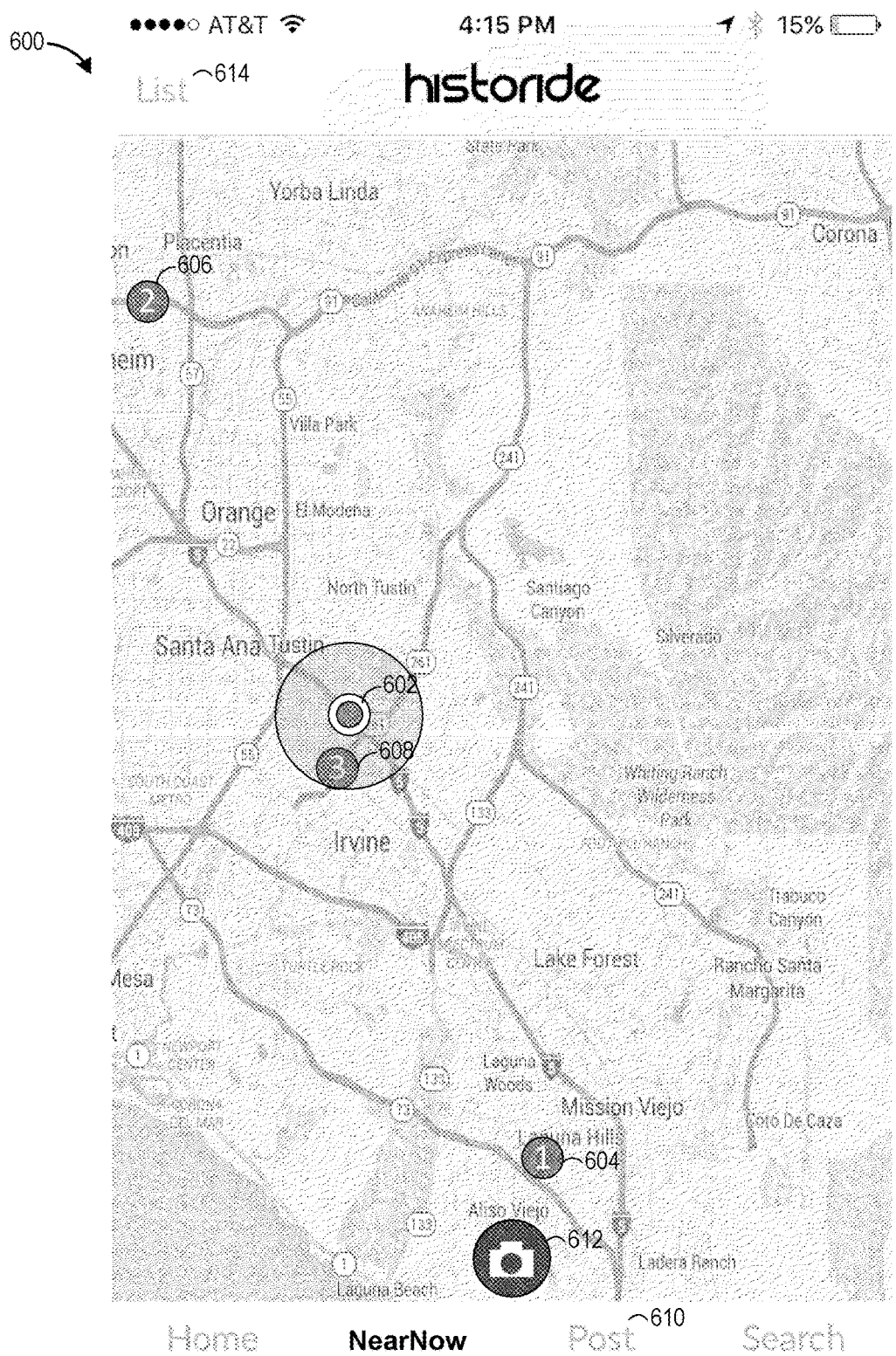
FIG. 6A illustrates an embodiment of a dynamically generated user-specific event map user interface.

FIG. 6A illustrates an embodiment of a dynamically generated user-specific event map user interface 600. As illustrated, the user interface 600 may display a location of the user using a pin 602 and the locations of the events via the pin 604, 606, 608. The user interface 600 may present the location of events that are within a threshold distance to the pin 602 representing the user's location. In the illustrated example, the threshold distance is such that the three events corresponding to the pins 604, 606, 608 are presented to the user. However, if, for example, the threshold distance was set to the outer radius of the circle around the pin 602, it is possible that only the event pin 608 may be presented to the user. Further, although each of the pins appears identical, in some implementations, some of the pins may be presented differently than some other of the pins. For example, if the event associated with the pin 606 satisfies a greater number of display criteria than the event associated with the pin 604 or a different set of display criteria, the pin 606 may be displayed differently than the pin 604. For example, the pin 606 may be larger, may be flashing, or may be of a different color.

Further, the user interface 600 may present the location of events that are occurring within a threshold time period of the current time period or of a time period specified by the user. In addition, if a user is at a location of interest and desires to post an event at the location to the topic specific networking application or network site, the user can select the post button 610 and be presented with a user interface for entering event data relating to the event at the user's location, or at some other location. Moreover, if a user is at a particular event and would like to post the picture of the event, the user could access an image capturing device on, for example, a mobile phone by selecting the camera button 612. Upon capturing an image of the event, the user could post the captured image to the topic specific networking site by selecting the post button 610. The posted event could then be categorized using, for example, the processes 300 and/or 400 and presented to other users who are within a threshold distance of the event using, for example, the process 200.

In some embodiments, in addition to, or instead of, displaying the events on a map, the events may be displayed to the user using an alternative user interface, such as a list. For example, by selecting the list button 614, a user may be presented with event details or postings related to the events corresponding to the pins 604, 606, 608. FIG. 6B illustrates an embodiment of a list user interface 650 corresponding to the events of the dynamically generated user-specific event map user interface of FIG. 6A. As illustrated by the user interface 650, information about the events may be presented to the user. Further, although these events may automatically be identified and presented to the user based on, for example, the user's location, the user may search for additional events occurring at a particular location or within a particular time using the search features 652. Further, the user may return to the map or view a map of the events presented in the list by selecting the map button 654.

Figure 7:
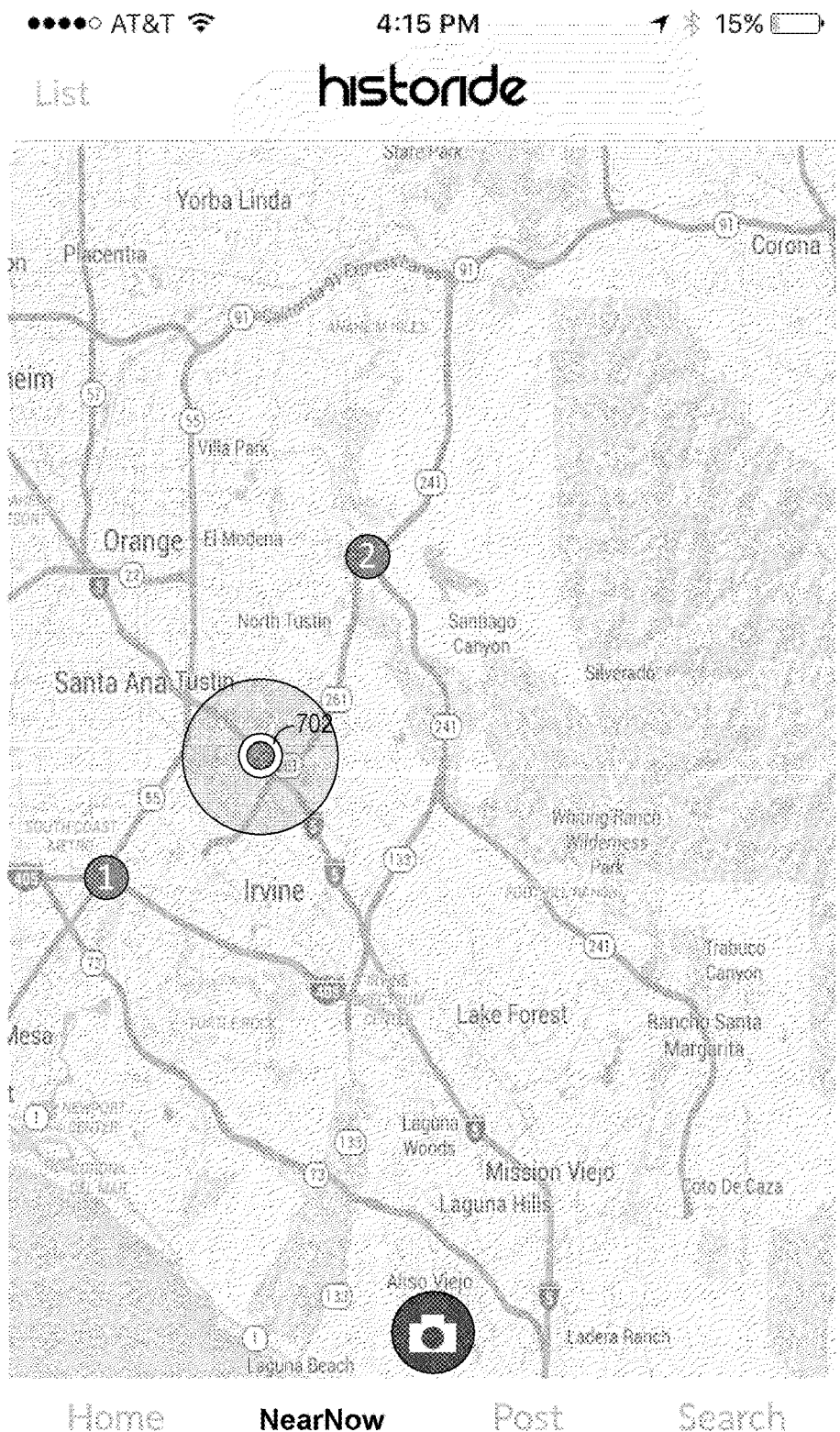
FIG. 7 illustrates a second embodiment of a dynamically generated user-specific event map user interface corresponding to the same geographic area as illustrated in FIG. 6A.

FIG. 7 illustrates a second embodiment of a dynamically generated user-specific event map user interface 700 corresponding to the same geographic area as illustrated in FIG. 6A. As illustrated by the pin 702, the user associated with the user interface 700 is in the same location as the user associated with the user interface 600. However, the user of the user interface 700 may be associated with different interests than the user of the user interface 600. Thus, different events may be presented to the user of the user interface 700 as illustrated by the pins located in different locations compared to the pins of the user interface 600.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    as implemented by one or more computing devices configured with specific computer-executable instructions,
        establishing a communication connection with a user computing device using a communication protocol;
        accessing a location application programming interface at the user computing device to request a location of the user computing device;
        receiving a set of location coordinates responsive to the location request;
        converting the set of location coordinates to a physical address;
        identifying a user associated with the user computing device;
        determining an interests category associated with the user;
        identifying an event occurring within a threshold distance of the physical address of the user computing device without receiving user input from the user, the event associated with the interests category;
        determining a set of display rules associated with the event based at least in part on event data associated with the event;
        generating a map of event locations including a location of the event, wherein the location of the event is illustrated on the map based at least in part on the set of display rules;
        associating the event with a time-to-live value based at least in part on the event data, the time-to-live value associated with a period of time when the event is included in the map of event locations; and
        outputting the map for display to the user.

2. A computer-implemented method comprising:
    as implemented by one or more computing devices configured with specific computer-executable instructions,
        establishing a communication connection with a user computing device using a communication protocol;
        accessing a location application programming interface at the user computing device to request a location of the user computing device;
        receiving a set of location coordinates responsive to the location request;
        converting the set of location coordinates to a physical address;
        identifying a user associated with the user computing device;
        determining an interests category associated with the user;
        identifying an event occurring within a threshold distance of the physical address of the user computing device without receiving user input from the user, the event associated with the interests category;
        determining a set of display rules associated with the event based at least in part on event data associated with the event;
        generating a map of event locations including a location of the event, wherein the location of the event is illustrated on the map based at least in part on the set of display rules; and
        outputting the map for display to the user, wherein determining the set of display rules comprises:
            determining whether the event data satisfies a first set of display criteria; and
            in response to determining that the event data satisfies the first set of display criteria:
                associating the event with a first set of display rules;
                determining whether the event data satisfies a second set of display criteria; and
                in response to determining that the event data satisfies the second set of display criteria, associating the event with a second set of display rules.

3. The computer-implemented method of claim 2, wherein in response to determining that the event data does not satisfy the first set of display criteria, associating the event with a default set of display rules.

4. The computer-implemented method of claim 1, wherein outputting the map for display comprises transmitting map data to the user computing device, enabling the user computing device to generate the map.

5. The computer-implemented method of claim 1, further comprising:
    receiving the event data associated with the event; and
    using a parameter model to obtain a classification of the event based at least in part on the event data, wherein the classification corresponds to the interests category.

6. The computer-implemented method of claim 1, further comprising determining a location radius for the event based at least in part on the event data, wherein the location of the user computing device is within the location radius.

7. A computer-implemented method comprising:
    as implemented by one or more computing devices configured with specific computer-executable instructions,
        establishing a communication connection with a user computing device using a communication protocol;
        accessing a location application programming interface at the user computing device to request a location of the user computing device;
        receiving a set of location coordinates responsive to the location request;
        converting the set of location coordinates to a physical address;
        identifying a user associated with the user computing device;
        determining an interests category associated with the user;
        identifying an event occurring within a threshold distance of the physical address of the user computing device without receiving user input from the user, the event associated with the interests category;
        determining a set of display rules associated with the event based at least in part on event data associated with the event;

generating a map of event locations including a location of the event, wherein the location of the event is illustrated on the map based at least in part on the set of display rules; and outputting the map for display to the user, wherein the threshold distance is based at least in part on a commute time between the physical address and the location of the event based at least in part on a commute criterion.

8. The computer-implemented method of claim 7, wherein the commute criterion includes one or more of a time of day or a traffic condition of a route between the physical address and the location of the event.

9. The computer-implemented method of claim 1, further comprising updating the map to illustrate a different set of event locations based at least in part on a determined change in the set of location coordinates of the user computing device.

10. A system comprising:
an electronic data store configured to store event data for a plurality of events occurring in the real world;
a hardware processor in communication with the electronic data store, the hardware processor configured to execute specific computer-executable instructions to at least:
establish a communication connection with a user computing device using a communication protocol;
access a location application programming interface at the user computing device to request a location of the user computing device;
receive a set of location coordinates responsive to the location request;
convert the set of location coordinates to a physical address;
identify a user associated with the user computing device;
determine an interests category associated with the user;
access the electronic data store to identify an event occurring within a threshold distance of the physical address of the user computing device without receiving user input from the user, the event associated with the interests category;
determine a set of display rules associated with the event based at least in part on event data associated with the event;
generate a map of event locations including a location of the event, wherein the location of the event is illustrated on the map based at least in part on the set of display rules;
associate the event with a time-to-live value based at least in part on the event data, the time-to-live value associated with a period of time when the event is included in the map of event locations; and
output the map for display to the user.

11. A system comprising:
an electronic data store configured to store event data for a plurality of events occurring in the real world;
a hardware processor in communication with the electronic data store, the hardware processor configured to execute specific computer-executable instructions to at least:
establish a communication connection with a user computing device using a communication protocol;
access a location application programming interface at the user computing device to request a location of the user computing device;
receive a set of location coordinates responsive to the location request;
convert the set of location coordinates to a physical address;
identify a user associated with the user computing device;
determine an interests category associated with the user;
access the electronic data store to identify an event occurring within a threshold distance of the physical address of the user computing device without receiving user input from the user, the event associated with the interests category;
determine a set of display rules associated with the event based at least in part on event data associated with the event;
generate a map of event locations including a location of the event, wherein the location of the event is illustrated on the map based at least in part on the set of display rules; and
output the map for display to the user, wherein the hardware processor is further configured to determine the set of display rules by:
determining whether the event data satisfies a first set of display criteria; and
in response to determining that the event data satisfies the first set of display criteria:
associating the event with a first set of display rules;
determining whether the event data satisfies a second set of display criteria; and
in response to determining that the event data satisfies the second set of display criteria, associating the event with a second set of display rules.

12. The system of claim 11, wherein in response to determining that the event data does not satisfy the first set of display criteria, the hardware processor is further configured to associate the event with a default set of display rules.

13. The system of claim 10, wherein the hardware processor is further configured to output the map for display by transmitting map data to the user computing device, enabling the user computing device to generate the map.

14. The system of claim 10, wherein the hardware processor is further configured to:
receive the event data associated with the event; and
use a parameter model to obtain a classification of the event based at least in part on the event data, wherein the classification corresponds to the interests category.

15. The system of claim 10, wherein the hardware processor is further configured to determine a location radius for the event based at least in part on the event data, wherein the location of the user computing device is within the location radius.

16. A system comprising:
an electronic data store configured to store event data for a plurality of events occurring in the real world;
a hardware processor in communication with the electronic data store, the hardware processor configured to execute specific computer-executable instructions to at least:
establish a communication connection with a user computing device using a communication protocol;
access a location application programming interface at the user computing device to request a location of the user computing device;
receive a set of location coordinates responsive to the location request;

convert the set of location coordinates to a physical address;

identify a user associated with the user computing device;

determine an interests category associated with the user;

access the electronic data store to identify an event occurring within a threshold distance of the physical address of the user computing device without receiving user input from the user, the event associated with the interests category;

determine a set of display rules associated with the event based at least in part on event data associated with the event;

generate a map of event locations including a location of the event, wherein the location of the event is illustrated on the map based at least in part on the set of display rules; and output the map for display to the user, wherein the threshold distance is based at least in part on a commute time between the physical address and the location of the event based at least in part on a commute criterion.

17. The system of claim 16, wherein the commute criterion includes one or more of a time of day or a traffic condition of a route between the physical address and the location of the event.

18. The system of claim 10, wherein the hardware processor is further configured to update the map to illustrate a different set of event locations based at least in part on a determined change in the set of location coordinates of the user computing device.

19. The computer-implemented method of claim 1, wherein the threshold distance is based at least in part on a commute time between the physical address and the location of the event based at least in part on a commute criterion.

20. The system of claim 10, wherein the threshold distance is based at least in part on a commute time between the physical address and the location of the event based at least in part on a commute criterion.

* * * * *